(12) United States Patent  (10) Patent No.: US 8,810,597 B2
Akiya et al.  (45) Date of Patent: Aug. 19, 2014

(54) IMAGE DISPLAY DEVICE AND COMPUTER-READABLE MEDIUM

(71) Applicant: Nikon Corporation, Tokyo (JP)

(72) Inventors: Hiroyuki Akiya, Tokyo (JP); Akihiko Hamamura, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/757,242

(22) Filed: Feb. 1, 2013

(65) Prior Publication Data

US 2013/0151597 A1  Jun. 13, 2013

Related U.S. Application Data

(63) Continuation of application No. 12/461,956, filed on Aug. 28, 2009, now abandoned.

(30) Foreign Application Priority Data

Sep. 3, 2008  (JP) ................................ 2008-225678

(51) Int. Cl.
*G09G 5/00*  (2006.01)
(52) U.S. Cl.
USPC .......................................... 345/619; 715/854
(58) Field of Classification Search
USPC ............ 715/854–855; 709/227–228; 345/619
See application file for complete search history.

(56) References Cited

U.S. PATENT DOCUMENTS

| | | | |
|---|---|---|---|
| 6,532,475 | B1 | 3/2003 | Nakano et al. |
| 6,748,383 | B1 | 6/2004 | Wada et al. |
| 6,820,092 | B2 | 11/2004 | Nakano et al. |
| 7,231,405 | B2 | 6/2007 | Xia |
| 7,281,021 | B2 | 10/2007 | Shiota et al. |
| 7,444,348 | B2 | 10/2008 | Fries et al. |
| 7,809,844 | B2 | 10/2010 | Abhishek et al. |

(Continued)

FOREIGN PATENT DOCUMENTS

| | | |
|---|---|---|
| JP | S62-140080 | 6/1987 |
| JP | A-2000-067083 | 3/2000 |

(Continued)

OTHER PUBLICATIONS

Toyama, Kentaro et al., "Geographic Location Tags on Digital Images," Proceedings of the ACM International Conference on Multimedia, 2003, pp. 1-11.

(Continued)

*Primary Examiner* — William Titcomb
(74) *Attorney, Agent, or Firm* — Oliff PLC

(57) ABSTRACT

An image display device includes: an image display unit that displays a list of images each including information related to a position of photography; a selection unit that selects at least one image from among the images; a photography position information acquisition unit that acquires information related to the position of photography; a specification unit that specifies a map server based on the information related to the position of photography; a requesting unit that transmits to the specified map server the information related to the position of photography, and that requests the map server to transmit map data for a range that includes the position of photography; a reception unit that receives the map data transmitted from the map server; and a display control unit that displays a map based on the received map data, and displays information specifying the position of photography upon the map.

9 Claims, 22 Drawing Sheets

(56) References Cited

U.S. PATENT DOCUMENTS

| | | |
|---|---|---|
| 7,954,064 B2 * | 5/2011 | Forstall et al. ............... 715/779 |
| 7,978,207 B1 | 7/2011 | Herf et al. |
| 8,132,151 B2 | 3/2012 | Ahern et al. |
| 2004/0064338 A1 | 4/2004 | Shiota et al. |
| 2005/0262062 A1 | 11/2005 | Xia |
| 2007/0038776 A1 | 2/2007 | Abhishek et al. |
| 2007/0250468 A1 | 10/2007 | Pieper |
| 2008/0065685 A1 | 3/2008 | Frank |
| 2008/0092054 A1 | 4/2008 | Bhumkar et al. |
| 2008/0140348 A1 | 6/2008 | Frank |
| 2008/0177793 A1 | 7/2008 | Epstein et al. |
| 2009/0077100 A1 | 3/2009 | Hancock et al. |
| 2009/0119255 A1 | 5/2009 | Frank et al. |
| 2009/0143977 A1 | 6/2009 | Beletski et al. |
| 2009/0222432 A1 | 9/2009 | Ratnakar |
| 2009/0222482 A1 | 9/2009 | Klassen et al. |
| 2009/0248833 A1 | 10/2009 | Frazier |
| 2010/0088522 A1 | 4/2010 | Barrus et al. |

FOREIGN PATENT DOCUMENTS

| | | |
|---|---|---|
| JP | A-2001-036840 | 2/2001 |
| JP | A-2001-109760 | 4/2001 |
| JP | A-2002-202976 | 7/2002 |
| JP | A-2004-320194 | 11/2004 |
| JP | A-2005-134519 | 5/2005 |
| JP | A-2007-011566 | 1/2007 |

OTHER PUBLICATIONS

Torniai, Carlo et al., "Sharing, Discovering and Browsing Geotagged Pictures on the Web," Technical Reports-Digital Media Systems Laboratory-HP Laboratories, 2007, pp. 1-18.

European Search Report issued in European Patent Application No. EP 09 16 9220 on May 26, 2010.

Aug. 20, 2013 Office Action issued in Japanese Application No. 2008-225678 (w/ English Translation).

* cited by examiner

FIG.3 CORRESPONDENCE TABLE BETWEEN LATITUDE/LONGITUDE AND COUNTRY CODES

| | ...... | ...... | ...... | NORTH LATITUDE 35° ~ | NORTH LATITUDE 36° ~ | ...... | ...... | ...... |
|---|---|---|---|---|---|---|---|---|
| ...... | ...... | ...... | ...... | ...... | ...... | ...... | ...... | ...... |
| ...... | ...... | ...... | ...... | ...... | ...... | ...... | ...... | ...... |
| EAST LONGITUDE 138° ~ | ...... | ...... | ...... | JP | JP | ...... | ...... | ...... |
| EAST LONGITUDE 139° ~ | ...... | ...... | ...... | JP | JP | ...... | ...... | ...... |
| ...... | ...... | ...... | ...... | ...... | ...... | ...... | ...... | ...... |
| ...... | ...... | ...... | ...... | ...... | ...... | ...... | ...... | ...... |
| ...... | ...... | ...... | ...... | ...... | ...... | ...... | ...... | ...... |
| ...... | ...... | ...... | ...... | ...... | ...... | ...... | ...... | ...... |

FIG.4 IMAGE LIST (INITIAL STATE)

| IMAGE ID 4a | FILE NAME 4b | LATITUDE 4c | LONGITUDE 4d | COUNTRY CODE 4e | DISPLAY FLAG 4f |
|---|---|---|---|---|---|
| 1 | DSCN_001.JPG | 42° 33' N | 42° 33' E | BG | ON |
| 2 | DSCN_010.JPG | 39° 12' S | 175° 04' W | NZ | ON |
| 3 | DSCN_101.JPG | 29° 33' N | 106° 26' E | CN | ON |
| 4 | DSCN_102.JPG | 30° 28' N | 112° 50' E | CN | ON |
| 5 | DSCN_111.JPG | 13° 40' N | 100° 30' E | TH | ON |
| 6 | DSCN_201.JPG | 35° 35' N | 139° 45' E | JP | ON |
| 7 | DSCN_202.JPG | 36° 06' N | 138° 10' E | JP | ON |

FIG.5

IMAGE LIST (AFTER SORTING IN ORDER OF COUNTRIES)

| IMAGE ID 4a | FILE NAME 4b | LATITUDE 4c | LONGITUDE 4d | COUNTRY CODE 4e | DISPLAY FLAG 4f |
|---|---|---|---|---|---|
| 1 | DSCN_201.JPG | 35° 35' N | 139° 45' E | JP | ON |
| 2 | DSCN_202.JPG | 36° 06' N | 138° 10' E | JP | ON |
| 3 | DSCN_102.JPG | 30° 28' N | 112° 50' E | CN | ON |
| 4 | DSCN_101.JPG | 29° 33' N | 106° 26' E | CN | ON |
| 5 | DSCN_111.JPG | 13° 40' N | 100° 30' E | TH | ON |
| 6 | DSCN_001.JPG | 42° 33' N | 42° 33' E | BG | ON |
| 7 | DSCN_010.JPG | 39° 12' S | 175° 04' W | NZ | ON |

FIG.6

COUNTRIES DISPLAY ORDER LIST

| DISPLAY ORDER 6a | COUNTRY CODE 6b |
|---|---|
| 1 | JP |
| 2 | CN |
| ・・・・・・ | ・・・・・・ |

FIG.10

IMAGE LIST (AFTER DISPLAY FLAGS ARE TURNED OFF)

| IMAGE ID | FILE NAME | LATITUDE | LONGITUDE | COUNTRY CODE | DISPLAY FLAG |
|---|---|---|---|---|---|
| 1 | DSCN_201.JPG | 35° 35' N | 139° 45' E | JP | ON |
| 2 | DSCN_202.JPG | 36° 06' N | 138° 10' E | JP | ON |
| 3 | DSCN_102.JPG | 30° 28' N | 112° 50' E | CN | ON |
| 4 | DSCN_101.JPG | 29° 33' N | 106° 26' E | CN | ON |
| 5 | DSCN_111.JPG | 13° 40' N | 100° 30' E | TH | OFF |
| 6 | DSCN_001.JPG | 42° 33' N | 42° 33' E | BG | OFF |
| 7 | DSCN_010.JPG | 39° 12' S | 175° 04' W | NZ | OFF |

FIG.12 CORRESPONDENCE TABLE BETWEEN MAP INFORMATION SERVERS FOR CONNECTION AND COUNTRIES

| PHOTOGRAPHY POSITION COUNTRY CODE | URL OF MAP INFORMATION SERVER TO BE CONNECTED TO | COUNTRY CODE WHERE MAP INFORMATION SERVER IS LOCATED |
|---|---|---|
| JP | http://~.jp/ | JP |
| CN | http://~.cn/ | CN |
| US | http://~.com/ | US |
| CA | http://~.com/ | US |
| ...... | ...... | ...... |

12a 12b 12c

US 8,810,597 B2

IMAGE DISPLAY DEVICE AND COMPUTER-READABLE MEDIUM

INCORPORATION BY REFERENCE

This is a continuation of U.S. patent application Ser. No. 12/461,956, filed on Aug. 28, 2009, which claims priority to Japanese Patent Application No. 2008-225678, filed on Sep. 3, 2008, the disclosure of each of which is incorporated herein by reference.

BACKGROUND OF THE INVENTION

1. Field of the Invention

The present invention relates to an image display device and a computer-readable medium.

2. Description of Related Art

The following type of portable terminal is per se known. When a user has actuated this portable terminal, it automatically determines its own position, downloads map data from a map server showing its own position, and displays a map with its own position indicated (refer to Japanese Laid-Open Patent Publication 2004-320194).

SUMMARY OF THE INVENTION

It is often the case that the map information supply company that owns the server that stores the map data to be supplied has a server in each country of the world. And, for each country in which a server is installed, it is often the case that, while the map data for the country in which the server is installed is highly detailed map data whose magnification ratio is high, the map data for other countries is less detailed map data whose magnification ratio is low. In this type of case, with a prior art portable terminal, no consideration has been given to which server should be selected to be the target server for downloading of map data. Due to this, such a system has not necessarily been able to acquire map data from the server upon which the most detailed map data is stored.

According to the 1st aspect of the present invention, an image display device comprises: an image display unit that displays a list of images each including information related to a position of photography; a selection unit that selects at least one image from among the images displayed by the image display unit; a photography position information acquisition unit that acquires information related to the position of photography of the image selected by the selection unit; a specification unit that specifies a map server based on the information related to the position of photography acquired by the photography position information acquisition unit; a requesting unit that transmits to the map server specified by the specification unit the information related to the position of photography acquired by the photography position information acquisition unit, and that requests the map server to transmit map data for a range that includes the position of photography; a reception unit that receives the map data transmitted from the map server; and a display control unit that displays a map based on the map data received by the reception unit, and displays information specifying the position of photography of the image selected by the selection unit upon the map.

According to the 2nd aspect of the present invention, in the image display device according to the 1st aspect, it is preferred that the specification unit specifies a country in which the image was photographed based on the information related to the position of photography of the image, and specifies a map server installed in that specified country as a map server from which map data is to be acquired.

According to the 3rd aspect of the present invention, in the image display device according to the 2nd aspect, it is preferred that: the information specifying the position of photography is latitude and longitude information for the position of photography; and the specification unit specifies the country in which the image was photographed by employing a conversion table for converting the latitude and longitude information for the position of photography into a country code for specifying a country.

According to the 4th aspect of the present invention, in the image display device according to the 2nd aspect, it is preferred that: the information specifying the position of photography is latitude and longitude information for the position of photography; and the specification unit specifies the country in which the image was photographed by transmitting the latitude and longitude information for the position of photography over the Internet to a conversion service that converts the latitude and longitude information for the position of photography into a country code for specifying a country, and that returns the country code.

According to the 5th aspect of the present invention, in the image display device according to any one of the 2nd through 4th aspects, it is preferred that when the selection unit has selected a plurality of images, the specification unit specifies, as a map server from which map data is to be acquired, a map server in a country, among countries of photography of the plurality of images, in which the greatest number of images were photographed.

According to the 6th aspect of the present invention, in the image display device according to any one of the 1st through 5th aspects, it is preferred that when a geodetic system of the map server is different from a geodetic system of the information related to the position of photography included in the image, the requesting unit requests the map server to transmit map data, after having converted the geodetic system of the information related to the position of photography included in the image, to the geodetic system of the map server.

According to the 7th aspect of the present invention, in the image display device according to any one of the 1st through 6th aspects, the image display device further comprises a notification unit that, when the image selected by the selection unit does not include the information relating to the position of photography, notifies a user a fact that the image does not include the information relating to the position of photography.

According to the 8th aspect of the present invention, in the image display device according to the 7th aspect, it is preferred that when the notification unit has notified the fact, the requesting unit requests a map server that is set in advance to transmit map data for a range that is set in advance.

According to the 9th aspect of the present invention, in the image display device according to any one of the 1st through 8th aspects, it is preferred that when no response has been received from the map server specified by the specification unit after a predetermined time has elapsed from when the server was requested to transmit map data, the requesting unit requests a map server installed in a country that is different from a country of the map server specified by the specification unit to transmit map data.

According to the 10th aspect, a computer-readable medium has computer executable instructions for performing steps comprising: an image display step of displaying a list of images each including information related to a position of photography; a selection step of selecting at least one image from among the images displayed by the image display step;

a photography position information acquisition step of acquiring information related to the position of photography of the image selected by the selection step; a specification step of specifying a map server based on the information related to the position of photography acquired by the photography position information acquisition step; a requesting step of transmitting to the map server specified by the specification step the information related to the position of photography acquired by the photography position information acquisition step, and that requests the map server to transmit map data for a range that includes the position of photography; a reception step of receiving the map data transmitted from the map server; and a display control step of displaying a map based on the map data received by the reception step, and displays information specifying the position of photography of the image selected by the selection step upon the map.

BRIEF DESCRIPTION OF THE DRAWINGS

FIG. 3 is a figure showing a concrete example of a correspondence table in which a correspondence is maintained between latitudes, longitudes, and country codes;

FIG. 4 is a figure showing a concrete example of an image list in its initial state;

FIG. 5 is a figure showing a concrete example of this image list when it has been sorted in order of longitude;

FIG. 6 is a figure showing a concrete example of a countries display order list;

FIG. 10 is a figure showing a concrete example of the image list, when restriction of the range of countries to be displayed has been performed;

FIG. 12 is a figure showing a concrete example of a correspondence table, in which a correspondence is maintained between country codes 12a that denote photographic positions, and URLs 12b of map information servers that are targets for connection;

DESCRIPTION OF THE PREFERRED EMBODIMENTS

Figure 1:
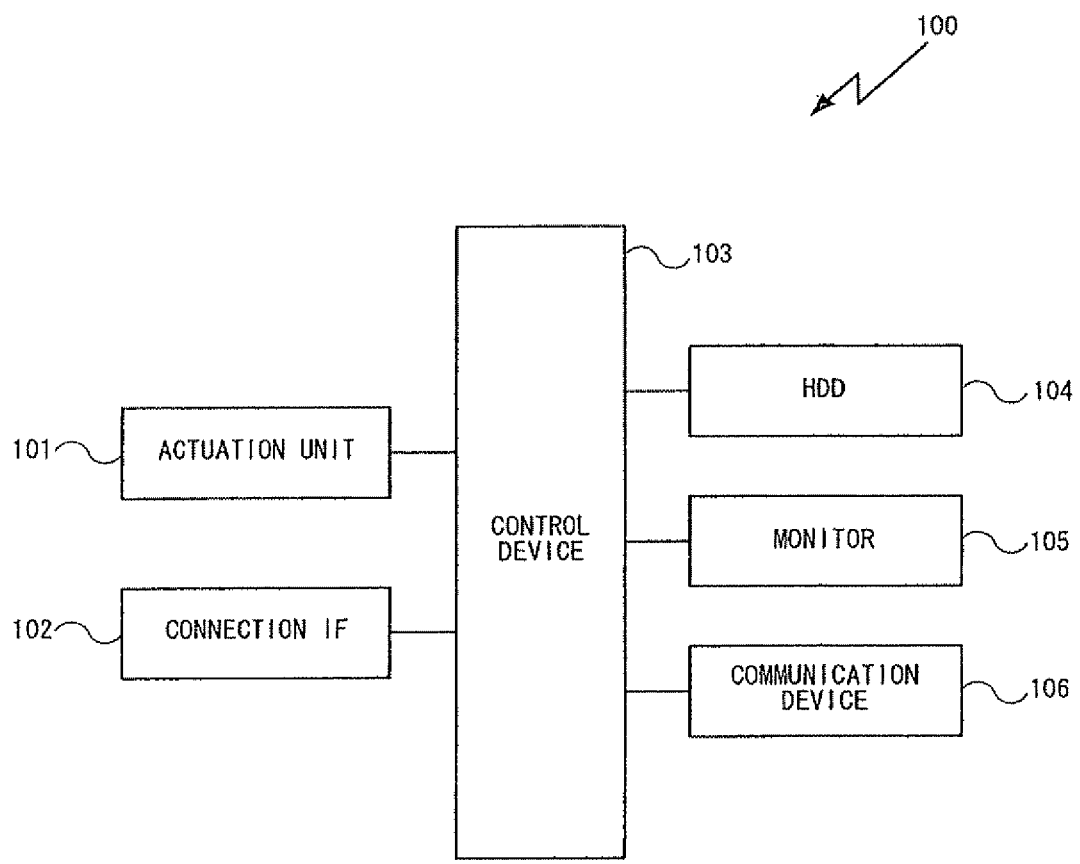
FIG. 1 is a block diagram showing the structure of an embodiment of a personal computer.

FIG. 1 is a block diagram showing the structure of an embodiment of a personal computer, that is an embodiment of the present invention. It should be understood that, as will be described hereinafter, based upon a command from a user, this personal computer 100 operates as an image display device by reading out and executing an image display program that is recorded upon a HDD (hard disk drive) 104.

This personal computer 100 comprises an actuation unit (member) 101, a connection IF (interface) 102, a control device 103, a HDD 104, a monitor 105, and a communication device 106.

The actuation unit includes various types of devices actuated by the user, for example a keyboard and/or a mouse. The connection IF 102 is an interface for connection of an external device such as a digital camera or the like, and may be, for example, a USB interface for establishing a wire connection to a digital camera or a video camera, or a wireless LAN module for establishing a wireless connection or the like. In this embodiment it will be supposed, by way of example, that data representing image files is downloaded from a digital camera via this connection IF 102.

In this embodiment, the digital camera from which image files are thus acquired is a camera that is equipped with a GPS unit, and, during photography, is capable of acquiring data that specifies the ground point (position or place) at which the image is photographed, such as, for example, latitude and longitude information for the ground point of photography. And this digital camera is able to record this data that specifies the ground point of photography and to store it in a portion of the header of the image file. In other words, the latitude and longitude information for the ground point of photography is recorded in a portion of the header of the image file that is downloaded from the digital camera via the connection IF 102, as data that specifies the ground point of photography. Moreover data for a thumbnail image, that is an image to be displayed, is also recorded in a portion of the header of the image file.

Figure 16:
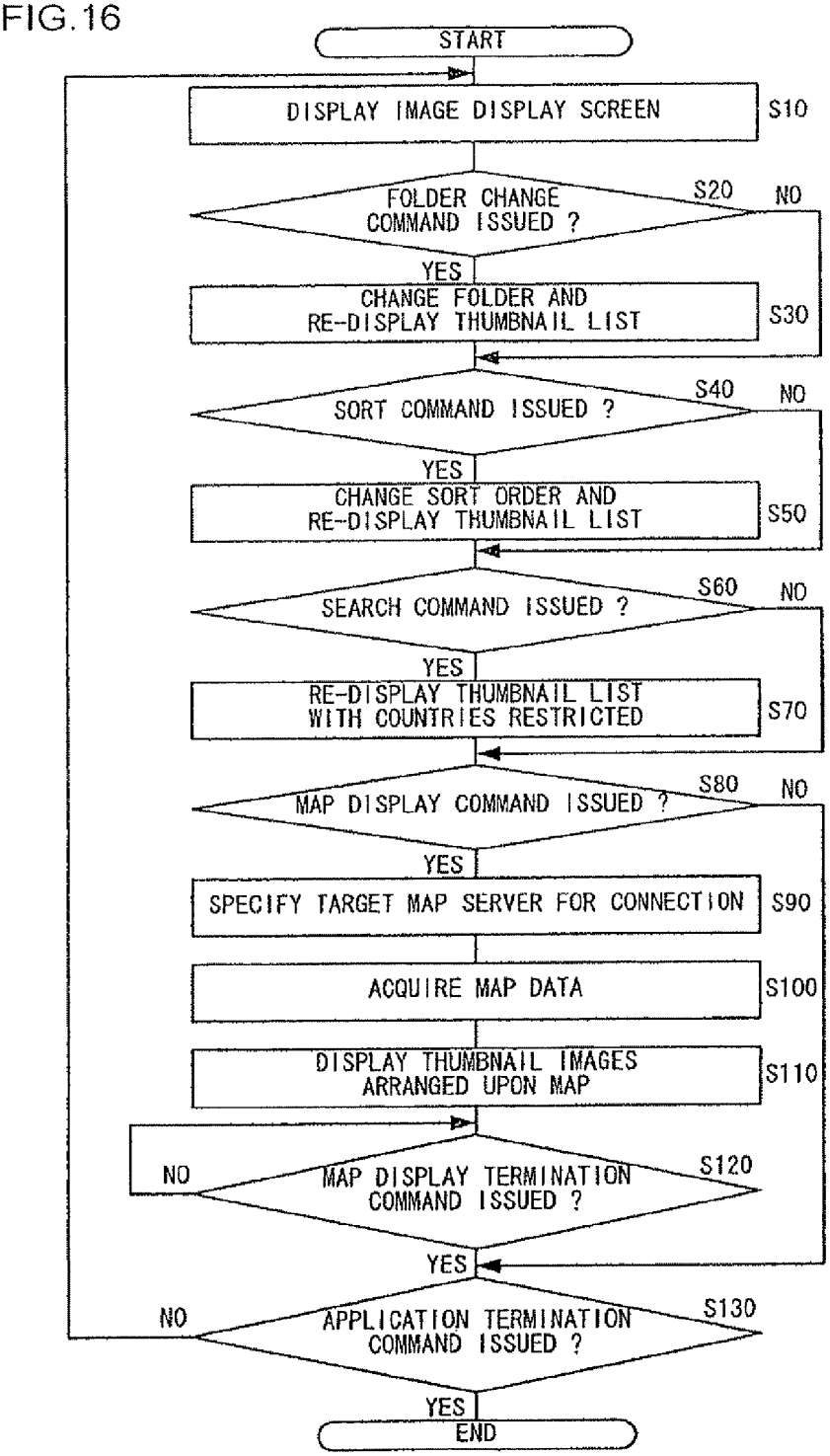
FIG. 16 is a flow chart showing processing performed by a personal computer 100.

The HDD 104 is a recording device for recording of image files that have been downloaded via the connection IF 102, for recording various programs executed by the control device 103, and so on. For example, data for an image display program for performing the processing described hereinafter in FIG. 16 is recorded on the HDD 104. This program is recorded and supplied upon a storage medium such as a CD-ROM or a DVD-ROM or the like. By installing this program upon the HDD 104 using this storage medium, the user is able to cause the control device 103 of the personal computer 100 to execute this image display program. And, as described above, by the control device 103 executing this image display program, the personal computer 100 comes to function as an image display device.

The monitor 105 may be, for example, a liquid crystal monitor, and displays images corresponding to display data outputted from the control device 103. The communication device 106 is a device for performing communication with an external device, for example a server, and may be, for example, a network card for connecting the personal computer 100 to a LAN circuit, a modem for connecting the personal computer 100 to a telephone circuit, or the like. In this embodiment, as will be described hereinafter, the personal computer 100 connects via the communication device 106 to an external map server upon which map data is recorded, and acquires map data therefrom. This map server to which the personal computer 100 connects may, for example, be a map server owned by a map information supply company or the like.

The control device 103 consists of a CPU, memory, and other peripheral circuitry, and performs overall control of the image processing device 100. It should be understood that the memory that is included in the control device 103 is volatile memory, for example SDRAM or the like. This memory is used as working memory for holding programs while they are being executed by the CPU, as buffer memory for temporarily recording data, and so on.

In this embodiment, when the user issues a command for execution of the image display application by actuating the actuation unit 101, the control device 103 starts the image display application by reading out the image display program recorded upon the HDD 104 into SDRAM, and starting that program. For example, the user may command the image display application to be executed by actuating the mouse, and by double clicking upon a short cut icon for the image display application that is displayed upon the screen.

Figure 2:
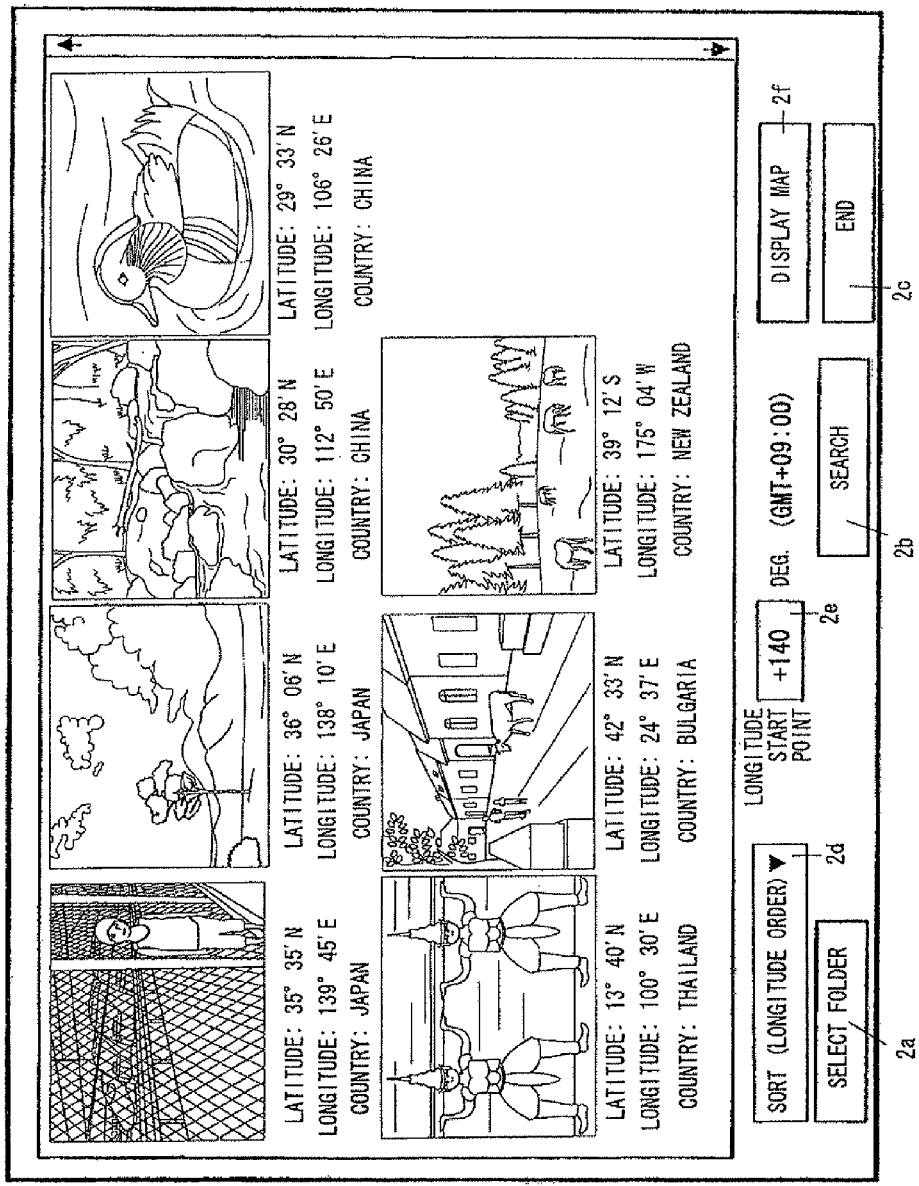
FIG. 2 is a figure showing a concrete example of an image display screen.

When the image display application has been started, the control device 103 displays an image display screen like that shown in FIG. 2 upon the monitor 105. And the control device 103 reads out the thumbnail images from the portions of the headers recorded upon the HDD 104 in which they are recorded, and displays them as a list to be seen at a glance upon the image display screen. The user is able to actuate the actuation unit 101 and, by selecting the "end" button 2c upon the image display screen, is able to issue a command for the execution of the image display application to be terminated. When the "end" button 2c is thus selected by the user, the control device 103 terminates display of the image display screen, and the execution of the image display application is terminated.

Furthermore, by the user actuating the actuation unit 101 and selecting the button 2a "folder selection" upon the image display screen, the user is able to select the folder in which the image files whose thumbnail images are to be displayed are recorded. It should be understood that, when this image display application starts, the control device 103 automatically selects a folder that is set in advance, or the folder that was selected when the application last ended, as the initial folder, and displays the thumbnail images of the image files that are recorded in this initial folder as a list.

In this thumbnail image list display upon the image display screen, the control device 103 also displays information related to the ground point (position or place) of photography of the image files that correspond to those thumbnail images. For example, as shown in FIG. 2, corresponding to each of the thumbnail images, as information related to the ground point of photography, the control device 103 displays information specifying the latitude and the longitude of the ground point of photography, and the country in which that photograph was taken. For doing this, when displaying the thumbnail images upon the image display screen, along with reading out the data for the thumbnail images from portions of the image headers of the image files, the control device 103 also reads out the latitude and longitude information for the ground points of photography from the other appropriate portions of the image headers. And, on the basis of this latitude and longitude information that it has read out, the control device 103 displays the latitudes and longitudes of the ground points of photography in correspondence with the thumbnail images.

Furthermore, on the basis of the latitude and longitude information that has been read out, the control device 103 specifies the country to which the ground point of photography belongs (the country of photography). In this embodiment, for example, as shown in FIG. 3, a correspondence table that maintains a correspondence between latitude and longitude, and country codes for identifying countries, is recorded upon the HDD 104, and the control device 103 specifies the country of photography on the basis of the latitude and longitude information by referring to this correspondence table. For example, if the latitude is between 35° N and 36° N and the longitude is between 138° E and 139° E, then the control device 103 acquires "JP" as the country code of the country of photography. And the control device 103 specifies the country of photography on the basis of its country code. For example, if the country code that has been acquired is "JP", then the country of photography is specified as being Japan.

As another example, if the country code that has been acquired is "CN", then the country of photography is specified as being China, while, if the country code is "BG", then the country of photography is specified as being Bulgaria. Moreover, if the country code that has been acquired is "NZ", then the country of photography is specified as being New Zealand, while, if the country code is "TH", then the country of photography is specified as being Thailand.

By actuating the actuation unit 101, the user can change the order in which the thumbnail images are displayed upon the image display screen. For example, by actuating the "sort" button 2D that is disposed upon the image display screen shown in FIG. 2, the user can change the order in which the thumbnail images are displayed, in other words the sort order, to either longitude order or latitude order. It should be understood that the example shown in FIG. 2 shows the case in which the sort order has been set by the user to longitude order, as will be explained hereinafter.

Moreover, by actuating the actuation unit 101, the user can restrict the thumbnail images that are displayed upon the image display screen. For example, by actuating the "search" button 2b that is disposed upon the image display screen shown in FIG. 2 and thereby designating an image search condition, the user can, among the image files that are recorded in the selected folder, restrict those whose thumbnail images are the subjects of display upon the image display screen.

By doing this, the control device 103 manages the thumbnail images displayed upon the image display screen using the image list shown in FIG. 4. In other words, the control device 103 creates the image list shown in FIG. 4 at the time of starting the image display application and displaying the image display screen upon the monitor 105. In this embodiment, the image list shown in FIG. 4 that is created when the image display application is started will be termed the "initial state image list".

On this image list, the control device 103 manages the display order of the thumbnail images with image IDs 4a. I.e., when starting the image display application, as shown in FIG. 4, the control device 103 adds an image ID to each of the image files, with the file names of all of the image files recorded in the initial folder being arranged in ascending order. By doing this, in the initial state of the image display screen, the thumbnail images are displayed as a list that is sorted in ascending order of the file names 4b. Moreover, in correspondence with each of the file names 4b, the control device 103 records a country code 4e that it acquires on the basis of the latitude information 4c and the longitude information 4d that it has read in from the appropriate portions of the headers of the image files, and by referring to the correspondence table shown in FIG. 3 on the basis of this latitude and longitude information.

Furthermore, in correspondence with each of the file names 4b, the control device 103 records a display flag 4f for managing whether or not the corresponding thumbnail image is to be displayed in the list upon the image display screen. And when, as a result of the user actuating the "search" button 2b, restriction of the thumbnail images that are to be the subjects of display has been performed, the control device 103 sets the display flags 4f that correspond to the file names 4b of those thumbnail images that are to be displayed in the list to ON, and sets the display flags 4f that correspond to the file names 4b of those thumbnail images that are to be omitted from the list display to OFF.

As shown in FIG. 4, when the image display application starts, the control device 103 sets the display flags 4f the file names 4b of all of the image files recorded in the initial folder to ON, so that the thumbnail images corresponding to all of the image files are displayed.

And when, by the "sort" button 2d upon the image display screen being actuated by the user, a command has been issued to change the display order of the thumbnail images, the control device 103 changes the image list on the basis of the contents of this sort command. In this embodiment, if the user has commanded the sorting order to be by order of longitude, the user is able to input a longitude that is to be the start point of sorting in a longitude start point input field 2e. It should be understood that, in this embodiment, if the longitude that is inputted into this longitude start point input field 2e is to be an East longitude, a "+" sign should be prefixed to it, while if it is to be a West longitude, a "−" sign should be prefixed to it. For example, if the user wishes to designate as the start point 140° East longitude, which is a longitude that includes Japan, so that the images will appear in the list with those images that the user has photographed in Japan appearing at the start, then the user should input "+140" in the longitude start point input field 2e.

When a longitude has been inputted by the user to the longitude start point input field 2e as a start point, then the control device 103 changes the input list so that the thumbnail images are displayed in order of longitude, in a clockwise direction from the start point that has been inputted. Due to this, the following processing is performed. First, the control device 103 refers to the image list that is already created, and changes the order of the records, so that they are arranged in descending order with East longitude 140°, i.e. the longitude 4d, as the start point. And then, after this change of order has been performed, the control device 103 extracts the country codes recorded in the country codes 4e in order from the head of the list, and registers these extracted country codes in the countries display order list shown in FIG. 6, in order of extraction.

At this time, if a country code that it is going to register is already registered in the countries display order list, then the control device 103 eliminates these duplicate country codes, so that they are not registered. Due to this, only a single country code for each country comes to be registered in the countries display order list, even if as shown in FIG. 4 there are a plurality of records in the image list with the same country code. And, as shown in FIG. 6, for each country code 6b that has been registered, the control device 103 adds a consecutive number in the order of registration, that becomes its display order 6a.

The control device 103 then sorts the records in the image list shown in FIG. 4 by using their country codes 4e as sort keys, so that their country codes are arranged in the order specified by the display order 6a registered in the countries display order list shown in FIG. 6, and updates the image ID 4a of each record, thus attaching image IDs in ascending order to the records after their order has been changed. At this time, if there are a plurality of records for which the country code is the same, then the control device 103 sorts those records by order of closeness to the longitude start point that has been inputted in the longitude start point input field 2e. Due to this, the image list shown in FIG. 4 is changed to the image list shown in FIG. 5.

And the control device 103 updates the thumbnail list upon the image display screen on the basis of the image list after it has been changed (i.e., as in FIG. 5)). Due to this, as shown in FIG. 2, the thumbnail images are displayed by taking 140° East longitude as the starting point, and so that the countries of photography are arranged in order of longitude in the clockwise direction from that starting point.

Furthermore if, by actuating the "sort" button 2d, the user has designated latitude order as the sort order, then the control device 103 changes the image list so that the thumbnail images are displayed in latitude order, taking the north pole as the starting point. The control device 103 refers to the image list that is already in existence, and changes the order of the records therein so that their latitudes 4c are ordered from 90° North latitude to 90° South latitude. And in this case, in a similar manner to the case when the records are sorted in order of longitude, the control device 103 extracts the country codes recorded in the country codes 4e in order from the record that is the first after the order of the records has been changed, and records the country codes that have been extracted in the countries display order list shown in FIG. 6 in order of extraction.

At this time, in a similar manner to the case when the records are sorted in order of longitude, if a country code that is about to be registered is already registered in the countries display order list, then the control device 103 does not register that country code, so that duplication of country codes is eliminated. Moreover, the control device 103 appends consecutive (running) numbers to the country codes 6b that it registers in order of registration, thus setting up the display order 6a.

Figure 7:
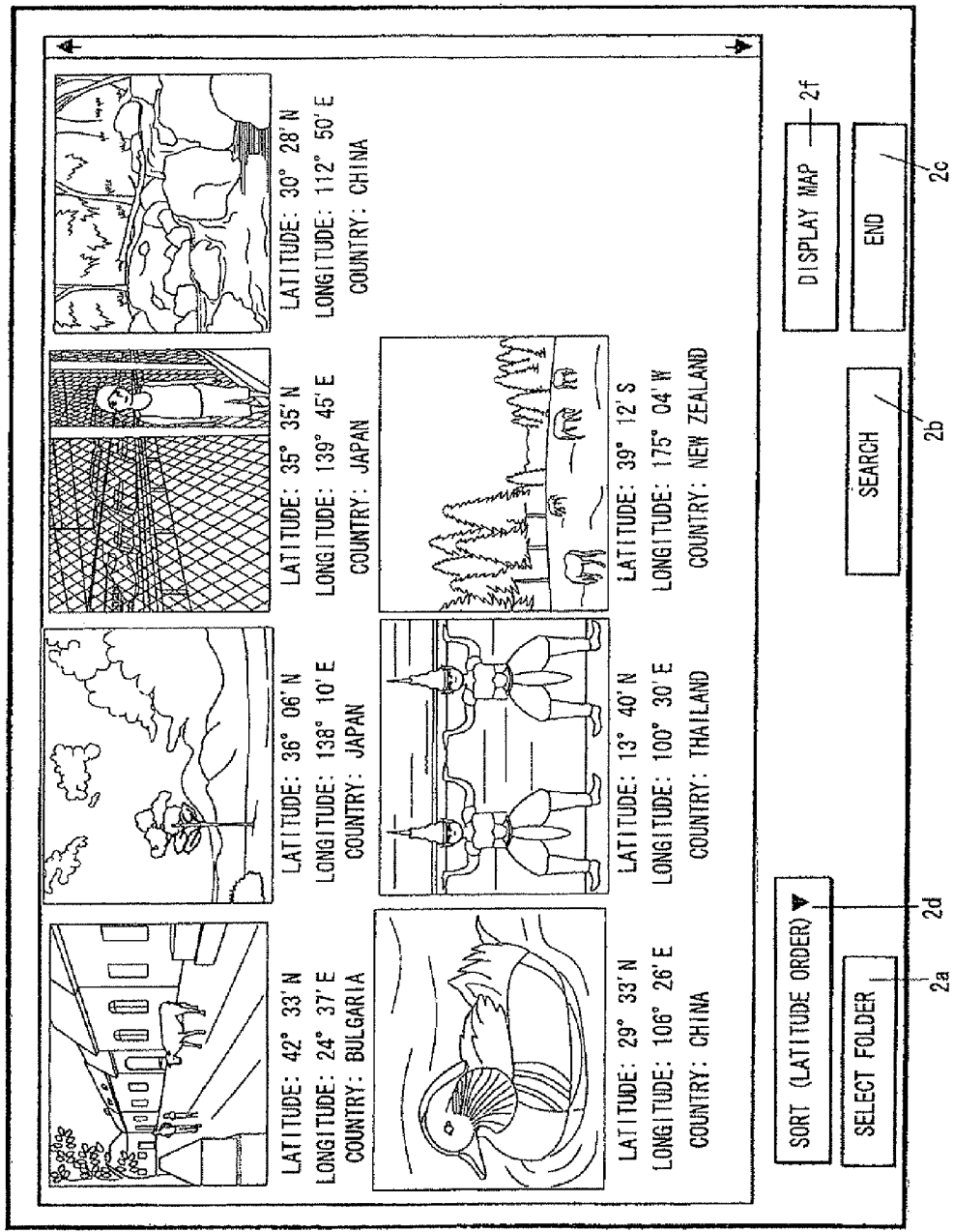
FIG. 7 is a figure showing a concrete example of an image display screen when its thumbnail images have been sorted in order of longitude.

And the control device 103 sorts the records in the image list by taking the country codes 4e as sort keys, so that the country codes are arranged in the order specified by their display order 6a as registered in the countries display order list shown in FIG. 6, and updates the image IDs 4a that are recorded so that image IDs are appended to the records in ascending order after the change of their arrangement And the control device 103 updates the thumbnail list upon the image display screen on the basis of the image list after alteration. At this time, if there are a plurality of records with the same country code, then the control device 103 sorts those records in order from North latitude 90°. By doing this, the thumbnail images are displayed in order of their countries of photography from North latitude 90°, as shown in FIG. 7.

Figure 8:
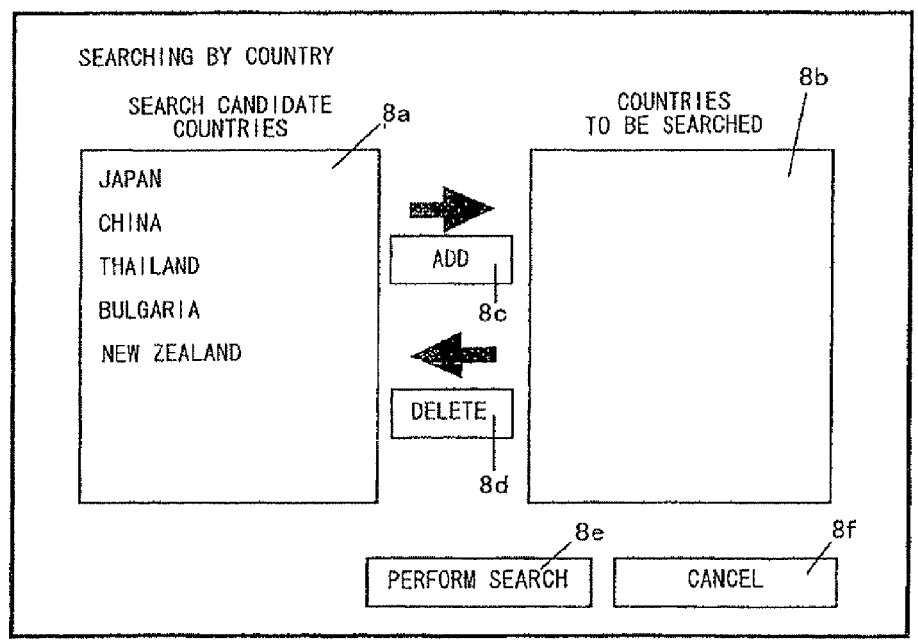
FIG. 8 is a first figure showing a concrete example of a screen for searching by country.

Next, the processing that is performed when the user has actuated the "search" button will be explained. When the "search" button 2b has been actuated by the user, the control device 103 displays the searching by country screen shown in FIG. 8. A search candidate countries display field 8a, a search subject countries display field 8b, an "add" button 8c, a "remove" button 8d, a "perform search" button 8e, and a "cancel" button 8f are arranged upon this searching by country screen.

Figure 9:
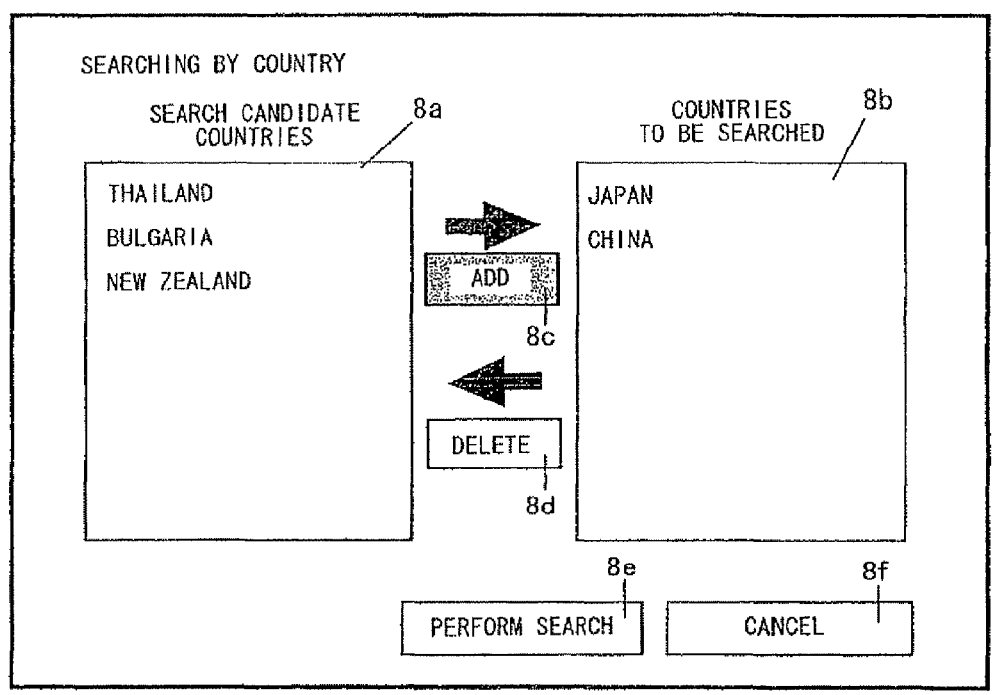
FIG. 9 is a second figure showing a concrete example of this screen for searching by country.

The control device 103 acquires from the image list the country codes registered in the country code fields 4e, converts these acquired country codes to the names of the corresponding countries, and displays them as a list in the search candidate countries display field 8a. Due to this, the countries in which were photographed the images whose thumbnail images were displayed upon the image display screen are displayed as a list in this search candidate countries display field 8a. By the user actuating the actuation unit 101, selecting from the search candidate countries display field 8a the name of some country of photography whose thumbnail images the user desires to display, and pressing the "add" button 8c, the user is able to shift the name of the selected country of photography to the search subject countries display field 8b. For example, if the user selects Japan and China from within the search candidate countries display field 8a and presses the "add" button 8c, then, as shown in FIG. 9, the control device 103 deletes Japan and China from the search candidate countries display field 8b and adds Japan and China to the search subject countries display field 8b.

On the other hand, by the user actuating the actuation unit 101, selecting from the search subject countries display field 8b the name of some country of photography whose thumbnail images the user desires to eliminate as subjects for display, and pressing the "remove" button 8d, the user is able to delete the name of a selected country of photography from the search subject countries display field 8b. When the "remove" button 8d has been pressed by the user, the control device 103 deletes the name of the selected country of photography from the search subject countries display field 8b, and adds this name of country of photography to the search candidate countries display field 8a.

By actuating the actuation unit 101 and pressing the "cancel" button 8f, the user is able to command termination of the display of this searching by country screen without performing searching by country. If the "cancel" button 8f has been pressed by the user, the control device 103 does not perform the searching by country processing that will be described hereinafter, but terminates the display of the searching by country screen and returns to displaying the image display screen.

By the user actuating the actuation unit 101 and is pressing the "perform search" button 8e, the user is able to issue a command for execution of searching by country, so as to display upon the image display screen only the thumbnail images of those images that were photographed in the country or countries of photography being displayed within the search subject countries display field 8b. When the "perform search" button 8e has been pressed by the user, the control device 103 changes the display flags 4f in the image list in the following manner. That is, the control device leaves the display flags 4f of records corresponding to images photographed in countries of photography that are being displayed in the search subject countries display field 8b at ON, while changing the display flags 4f of records corresponding to images photographed in countries of photography that are not being displayed in the search subject countries display field 8b to OFF.

For example, if as shown in FIG. 9 Japan and China are being displayed in the search subject countries display field 8b, then, as shown in FIG. 10, the control device 103 changes the display flags 4f in the records for the country codes other than JP (Japan) and CN (China) to OFF. It should be understood that FIG. 10 shows the image list obtained by taking as the subject the image list sorted in longitude order shown in FIG. 5, and by moreover performing searching by country with the display subjects restricted to Japan and China.

Figure 11:
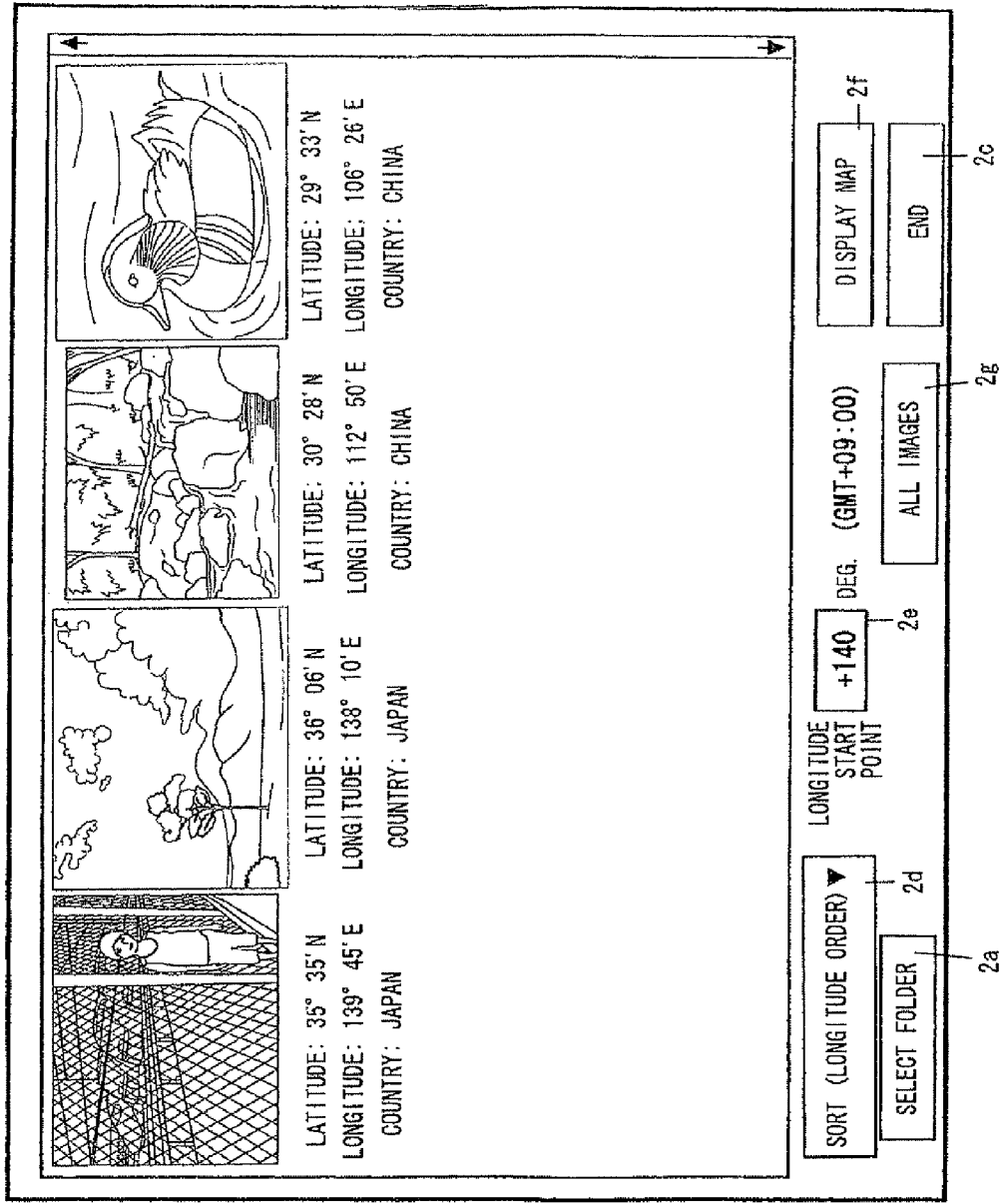
FIG. 11 is a figure showing a concrete example of the image display screen, when restriction of the range of countries to be displayed has been performed.

And the control device 103 displays, upon the image display screen, a thumbnail list based upon the image list after the display flags 4f have been changed. In concrete terms, as shown in FIG. 11, the control device 103 restricts the subjects for display in this thumbnail list, to only those records within the image list shown in FIG. 10 for which the display flags 4f are set to ON. Due to this, the thumbnail images displayed upon the image display screen can be restricted to being only those thumbnail images whose countries of photography have been set by the user upon the searching by country screen.

It should be understood that, on the image display screen after searching by country has been performed, the control device 103 changes the "search" button 2b to an "all images" button 2g. And, if the user actuates the actuation unit 101 and presses this "all images" button 2g, then the control device 103 cancels the searching by country. In other words, it returns the display flags 4f of all of the records in the image list shown in FIG. 10 to ON, and thereby the thumbnail images that correspond to all of the images registered in the image list are displayed upon the image display screen.

By the user actuating the actuation unit 101 and selecting at least one thumbnail image displayed upon the image display screen, and by the user then pressing the "display map" button 2f that is disposed upon the image display screen, it is possible for the user to issue a command for the ground points at which the images corresponding to the selected thumbnail images were photographed to be displayed by being shown upon a map.

When the display button 2f has been pressed by the user, the control device 103 refers to the image list, and specifies the country codes of the records corresponding to the thumbnail images being displayed upon the image display screen. And, on the basis of these country codes that have been specified, the control device 103 determines a map server for acquisition of map data. In concrete terms, the control device 103 refers to a correspondence table shown in FIG. 12, acquires a URL 12b of a map information server to be connected to corresponding to a photography position country code 12a, accesses the URL that has thus been acquired, and acquires map data from this map server.

It should be understood that the correspondence table shown in FIG. 12 is created in advance and recorded upon the HDD 104. In this correspondence table, a correspondence is maintained between the photography position country codes 12a described above, the URLs of map information servers to be connected to, and country codes 12c of the countries where these map information servers are located. In this embodiment, in principle, this correspondence table is set up so that map data is acquired from map servers installed in the countries of photography of the images that are displayed upon the map. For example, for "JP" as the photography position country code 12a, the URL of a map server that is installed within Japan is set as the URL 12b of the map information server to be connected to, so that, if an image that has been photographed in Japan is to be displayed upon a map, then map data will be acquired by connecting to this map server within Japan.

The reason why it is preferable to acquire the map data from a map server installed in the country in which the image that is to be displayed upon the map was photographed, is as follows. That is, generally a map information supply company records, upon a map server installed in each country, detailed map data (map data whose scale is large) for that country of installation; but on the other hand it is often the case that, on that server, for other countries, only coarse map data is recorded (i.e. map data whose scale is small).

Due to this, when displaying an image upon a map, if the map data is acquired from a map server installed in a country other than the country in which this image was photographed, then there is a significant possibility that the image will be displayed upon a coarse-scale map, and this is not desirable. On the other hand, if the map data is acquired from a map server installed in the country in which the image was photographed, then it is very likely that the map upon which the image will be displayed is a detailed one.

It should be understood that it is not necessarily the case that a map supply company installs a map server in each country individually; there may well be some countries in which no map server is installed. For example, the case may be considered in which the map supply company does not install any map server in Canada, but instead stores the detailed map data for Canada on a map server that is installed in America. In this case, as shown in FIG. 12, for the photography position country code 12a of "CA" that represents Canada, the country code where the map information server is located is set to "US" that represents America; in other words, the URL of a server that is installed in America is set as the URL 12b of the map information server that is to be connected to.

Figure 13A:
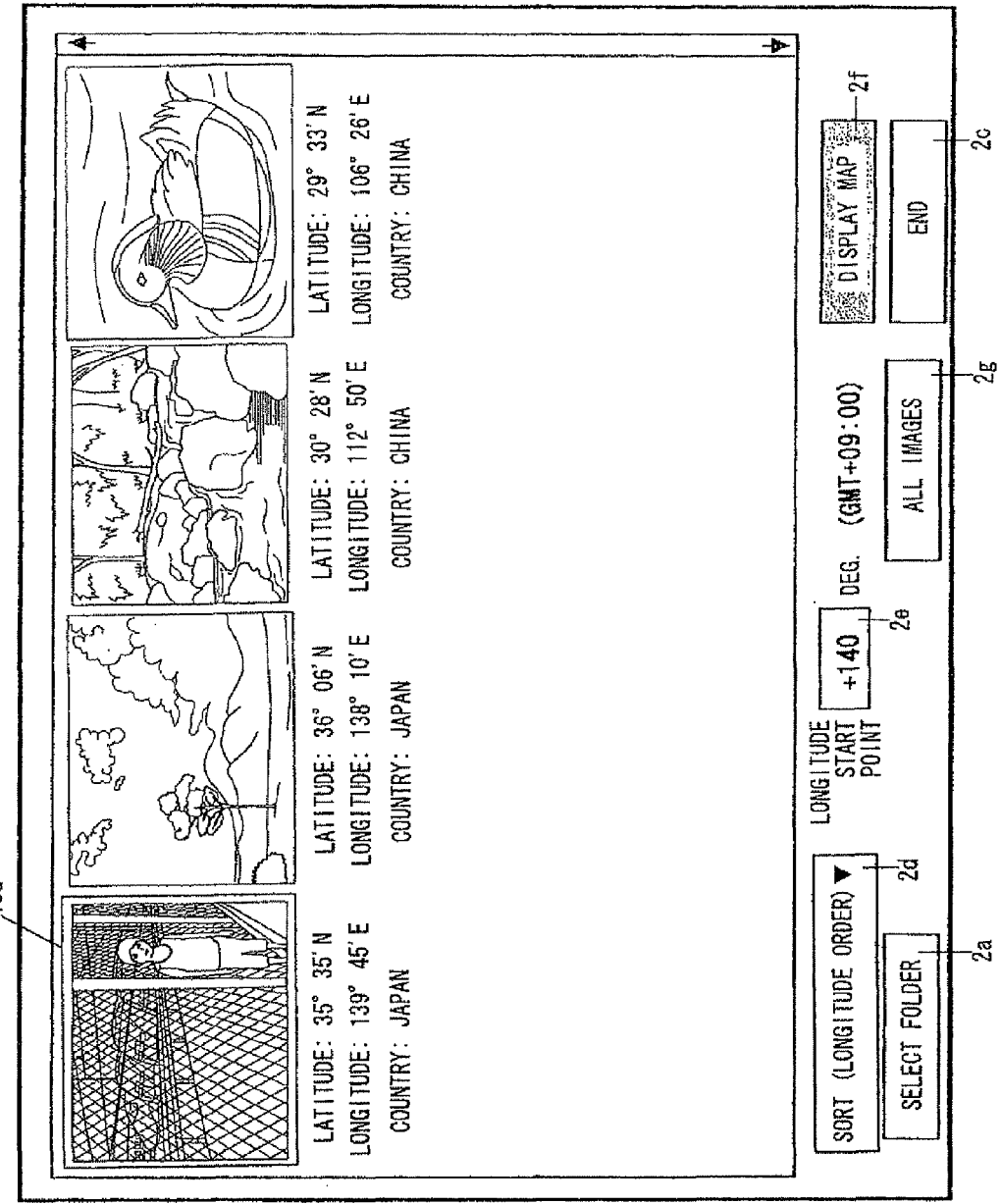
FIGS. 13A and 13B are figures showing a first example of display of an image upon a map.

Examples of display of images upon maps will now be explained with reference to FIGS. 13 through 15. FIG. 13A shows a case in which, upon the image display screen, the user has selected a thumbnail image 13a whose image was photographed in Japan, and has then pressed the "display map" button 2f. In this case, the control device 103 refers to the correspondence table shown in FIG. 12, acquires the URL 12b of the map information server to be connected to corresponding to the photography position country code 12a "JP", accesses the URL thus acquired via the communication device 106, and acquires map data from the map server thus accessed.

At this time, when the control device 103 transmits latitude and longitude information that specifies the ground point of photography of the display subject image to the map server that is the target for connection, then this map server transmits map data for a range that includes the ground point of photography to the personal computer 100.

Figure 13B:
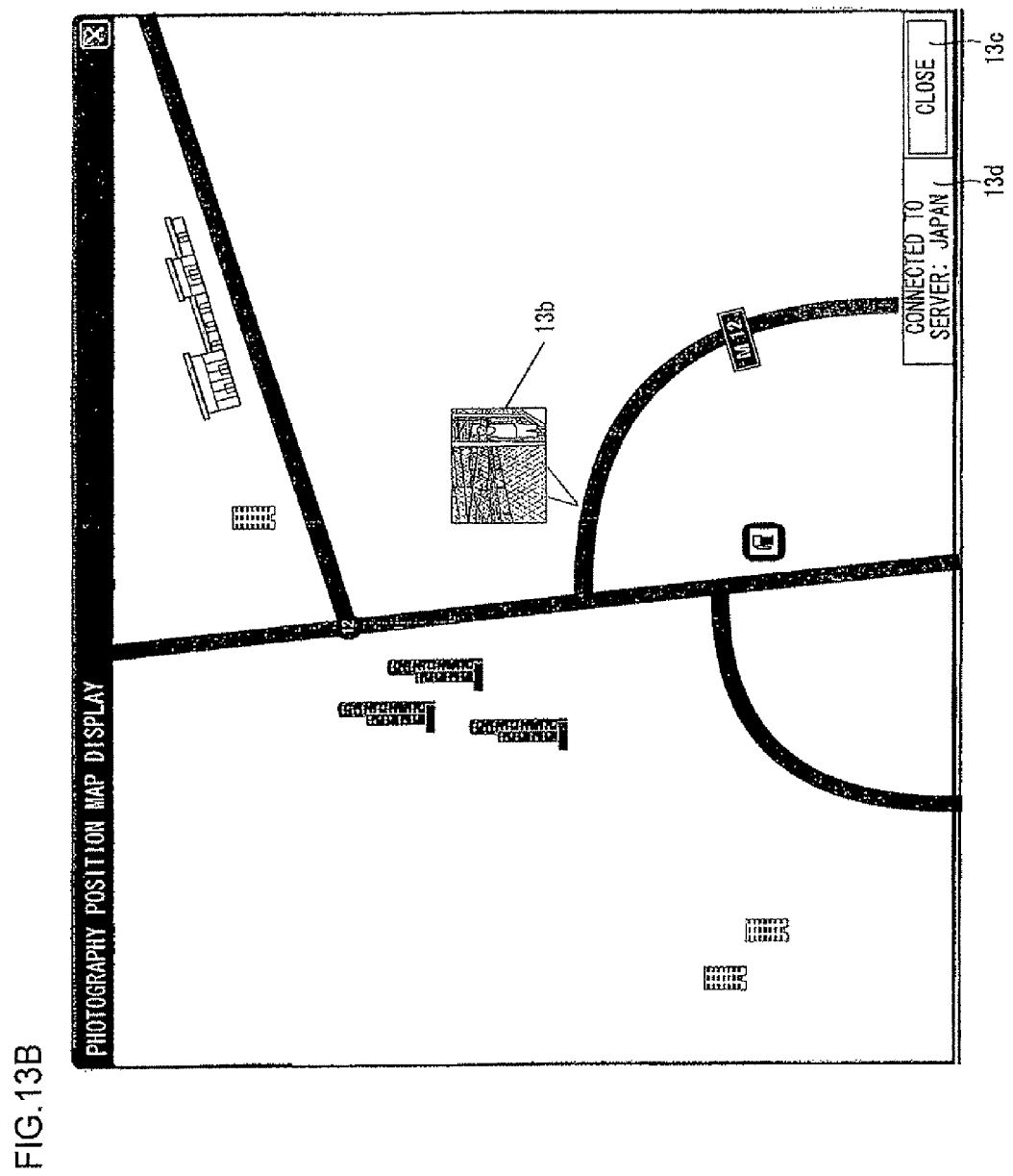

And, as shown in FIG. 13B, the control device 103 displays on the monitor 105 a map based upon the map data that has thus been acquired, and, based upon the latitude and longitude information for the ground point of photography of the thumbnail image 13a, displays a thumbnail image 13b in the neighborhood of the ground point of photography upon this map. It should be understood that the thumbnail image 13a and the thumbnail image 13b are the same. Due to this, it is possible to display the thumbnail image 13b, of which the country of photography is Japan, as being located upon a map that has been acquired from the map server within Japan, upon which detailed map data for Japan is recorded.

Figure 14A:
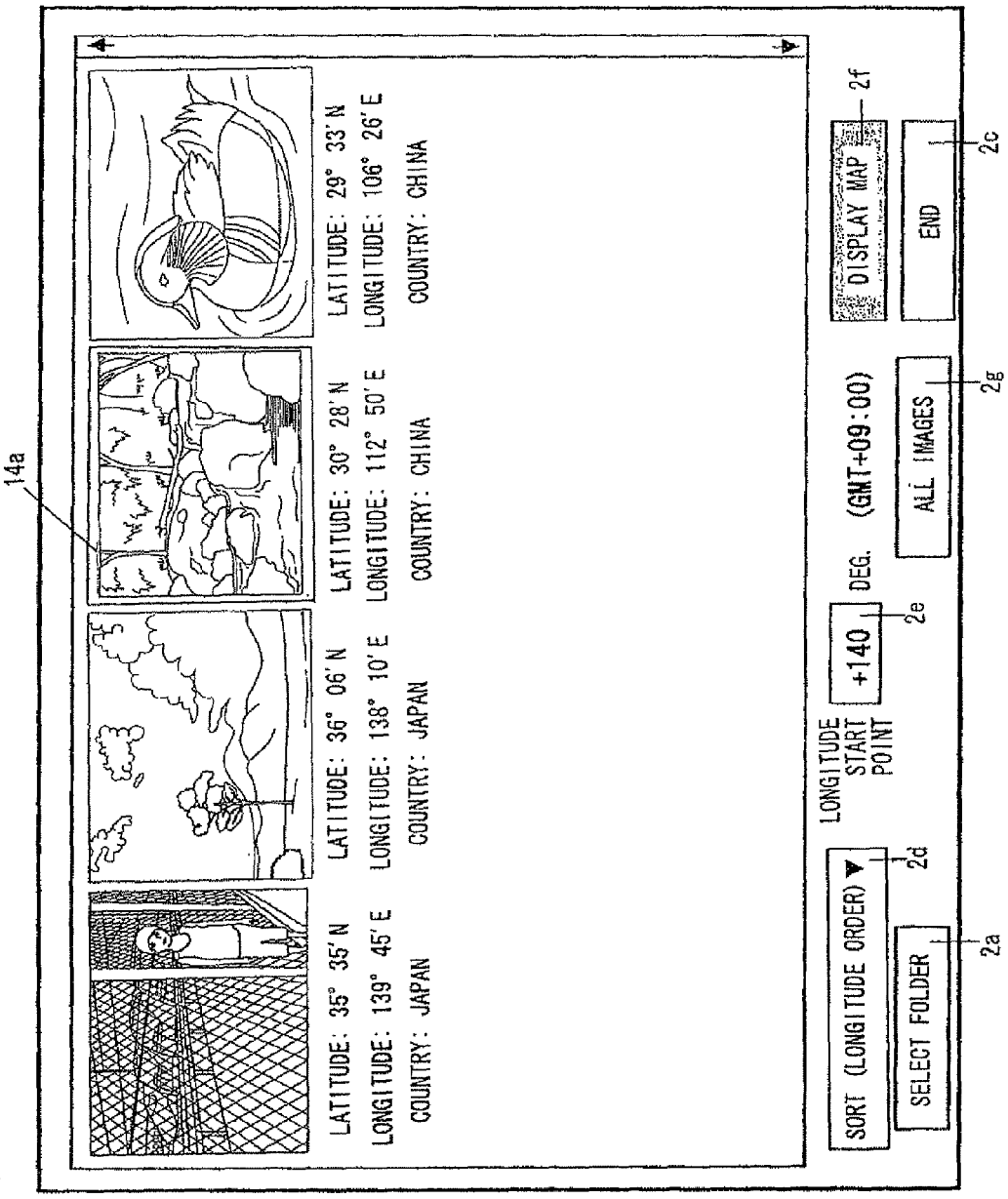
FIGS. 14A and 14B are figures showing a second example of display of an image upon a map.

FIG. 14A shows a case in which, upon the image display screen, the user has selected a thumbnail image 14a whose image was photographed in China, and has then pressed the "display map" button 2f. In this case, the control device 103 refers to the correspondence table shown in FIG. 12, acquires the URL 12b of the map information server to be connected to corresponding to the photography position country code 12a "CN", accesses the URL thus acquired via the communication device 106, and acquires map data from the map server thus accessed.

At this time, when the control device 103 transmits latitude and longitude information specifying the ground point of photography of the image to be the subject of display to the map server that is the target for connection, then the map server transmits map data having a range that includes the ground point of photography to the personal computer 100.

Figure 14B:
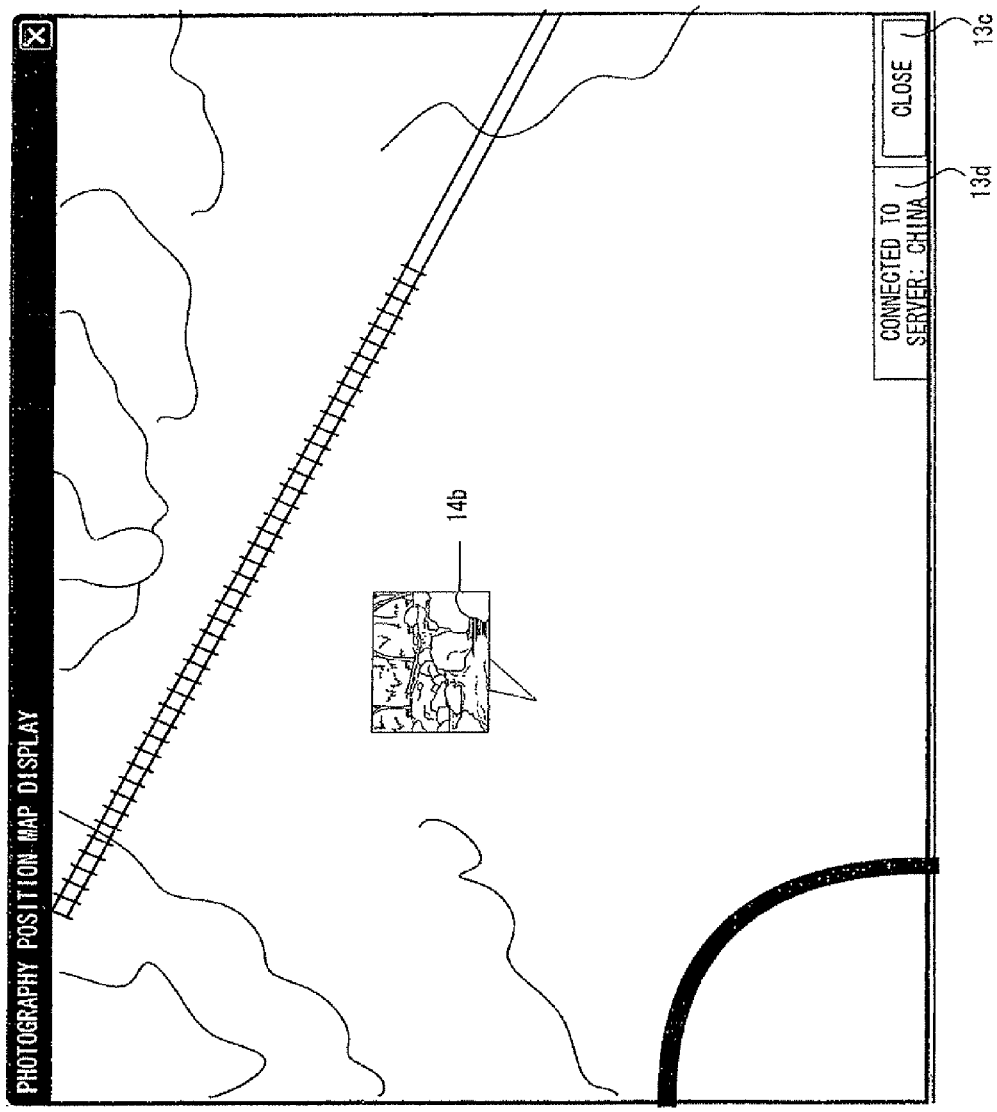

And, as shown in FIG. 14B, the control device 103 displays a map upon the monitor 105 based upon the map data that has thus been acquired, and, based upon the latitude and longitude information for the ground point of photography of the thumbnail image 14a, displays the thumbnail image 14b in the neighborhood of the ground point of photography upon this map. It should be understood that the thumbnail image 14a and the thumbnail image 14b are the same. Due to this, it is possible to display the thumbnail image 14b, of which the country of photography is China, as being located upon a map that has been acquired from the map server within China, upon which detailed map data for China is recorded.

Figure 15A:
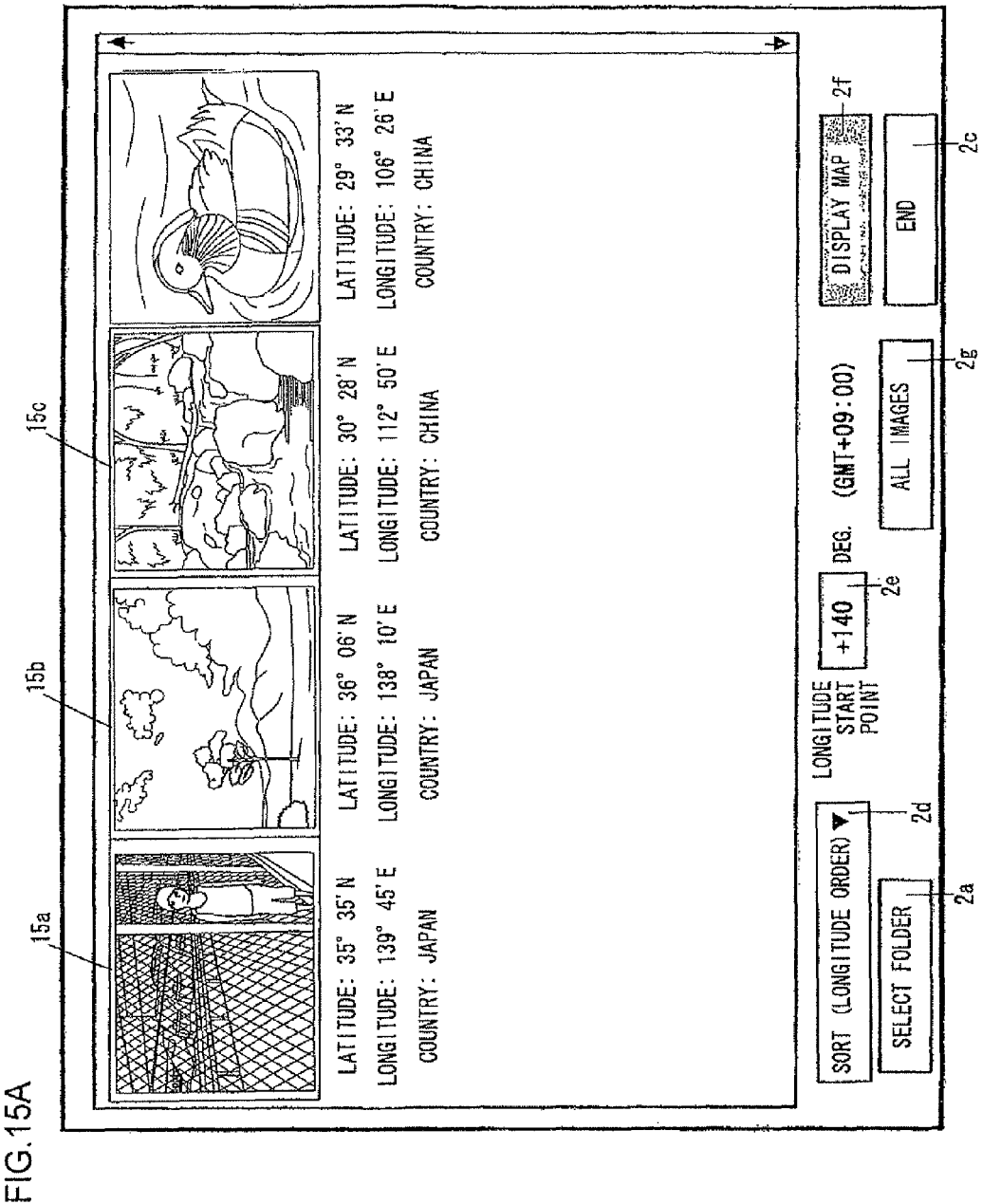
FIGS. 15A and 15B are figures showing a third example of display of an image upon a map.

FIG. 15A shows a case in which, upon the image display screen, the user has selected two thumbnail images 15a and 15b whose images were photographed in Japan and one thumbnail image 15c whose image was photographed in China, and has then pressed the "display map" button 2f. If, in this manner, a plurality of thumbnail images are selected whose images were photographed in a plurality of countries, then the control device 103 determines in which country were photographed the greatest number of these images whose thumbnails have been selected, and connects to the map server that is installed in that country. Accordingly, in the example shown in FIG. 15A, the control device 103 refers to the correspondence table shown in FIG. 12, acquires the URL 12b of the map information server to be connected to corresponding to the photography position country code 12a "JP", accesses the URL thus acquired via the communication device 106, and acquires map data from the map server thus accessed.

At this time, when the control device 103 transmits to the map server that is the target for connection latitude and longitude information specifying the ground points of photography of all of the images that are to be the subjects for display, then the map server transmits to the personal computer 100 map data having a range including the ground points of photography of all these images.

Figure 15B:
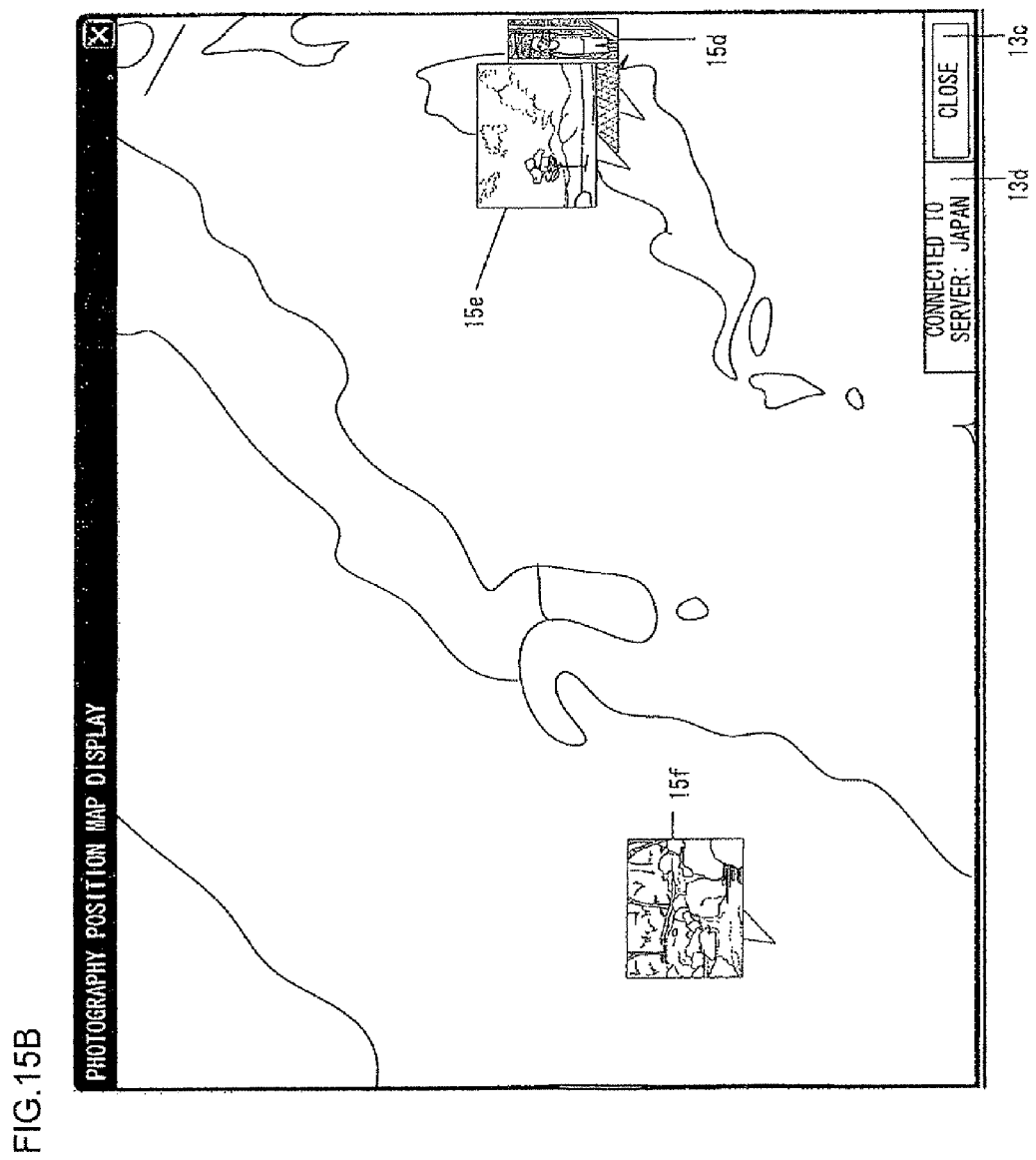

And, as shown in FIG. 15B, the control device 103 displays a map upon the monitor 105 on the basis of the acquired map data, and, on the basis of the latitude and longitude information for the ground points of photography of the thumbnail images 15a, 15b, and 15c, displays those thumbnail images 15d, 15e, and 15f upon this map in the neighborhood of their respective ground points of photography. It should be understood that the thumbnail image 15a is the same as the thumbnail image 15d, the thumbnail image 15b is the same as the thumbnail image 15e, and the thumbnail image 15c is the same as the thumbnail image 15f. Due to this, even if the plurality of thumbnail images selected by the user are for images that have been photographed in a plurality of countries, still it is possible to display them as arranged upon a detailed map of the country for which the largest number of thumbnail images were selected.

In target of connection display fields 13d upon the map display screens shown in FIGS. 13B, 14B, and 15B, the control device 103 displays the location of the server that is the target of connection, in other words the country in which the server that is the target for connection is installed. Moreover, by the user actuating the actuation unit 101 and pressing a "close" button 13c upon any of the map display screens shown in FIG. 13B, 14B, or 15B, the user is able to issue a command to close this map display screen. When this "close" button is pressed, the control device 103 terminates the display of the map display screen, and returns to the image display screen.

FIG. 16 is a flow chart showing processing performed by the personal computer 100 in this embodiment. The processing shown in FIG. 16 is executed by the control device 103, and is a program that is started when a command for execution of the image display application is issued by the user.

In a step S10, the control device displays the image display screen described above upon the monitor 105, and creates the initial state image list shown in FIG. 4. And it displays a thumbnail list upon the image display screen on the basis of this image list that it has created. Then the flow of control proceeds to a step S20, in which the control device 103 decides whether or not, by the actuation unit 101 being actuated by the user, the "folder selection" button 2a has been pressed and the folder from which image files are to be read in has been changed. If the result of the decision in this step S20 is negative, then the flow of control is transferred to a step S40 that will be described hereinafter. But, if the result of the decision in the step S20 is affirmative, then the flow of control is transferred to a step S30.

In this step S30, the control device 103 changes the folder on the basis of command from the user, and changes the image list on the basis of the image files recorded in the folder after it has been changed. And the control device 103 re-displays the thumbnail list upon the image display screen on the basis of the image list after it has been changed. Then the flow of control proceeds to the step S40.

In this step S40, the control device 103 decides whether or not the "sort" button 2d has been actuated by the user actuating the actuation unit 101. If the result of the decision in this step S40 is negative, then the flow of control is transferred to a step S60 that will be described hereinafter. But, if the result of the decision in the step 340 is affirmative then the flow of control is transferred to a step S50. In the step S50, the control device changes the image list on the basis of the actuation of the "sort" button 2d by the user, as described above, and re-displays the thumbnail list upon the image display screen on the basis of the image list after it has been changed. Then the flow of control proceeds to the step S60.

In the step S60, the control device 103 decides whether or not the "search" button 2b has been pressed by the user actuating the actuation unit 101, so as to command searching by country to be executed. In other words the control device 103 decides whether or not, when the "search" button 2b has been pressed, the user has issued a command for display of the searching by country screen shown in FIGS. 8 and 9, and for searching to be performed by designating, upon the searching by country screen, the name of a subject country of photography for display of thumbnail images. If the result of the decision in this step S60 is negative, then the flow of control is transferred to a step S80 that will be described hereinafter. But, if the result of the decision in the step S60 is affirmative, then the flow of control is transferred to a step S70.

In the step S70, the control device 103 changes the image list so that only the images photographed in the countries displayed in the search subject countries display field 8b upon the searching by country screen are utilized as subjects for display. And the control device 103 displays a thumbnail list upon the image display screen on the basis of this image list after it has been changed. Then the flow of control proceeds to the step S80.

In the step S80, the control device 103 decides whether or not, by the user actuating the actuation unit 101, at least one thumbnail image has been selected from within the thumbnail list, and the "display map" button 2f has bee pressed. If the result of the decision in this step S80 is negative, then the flow of control is transferred to a step S130 that will be described hereinafter. But, if the result of the decision in the step S80 is affirmative, then the flow of control is transferred to a step S90. In this step S90, the control device 103 refers to the image list, specifies the country of photography of the thumbnail images selected by the user, and refers to the correspondence table shown in FIG. 12, thereby specifying a map server that is to be the target for connection. Then the flow of control proceeds to a step S100.

In this step S100, as previously described, the control device 103 transmits latitude and longitude information specifying the ground points of photography of the display subject images to the map server that is the target for connection, and, as a result, acquires map data transmitted from the map server for a range that includes these ground points of photography. Then the flow of control proceeds to a step S110, in which the control device 103 displays a map screen upon the monitor 105, and displays a map upon this screen on the basis of the acquired map data. And the control device 103 also displays, upon this map, the thumbnail images that were selected by the user. Then the flow of control proceeds to a step S120.

In this step 9120, the control device decides whether or not the "close" button 13c upon the map display screen has been pressed by the user. If the decision in this step 9120 is affirmative, then the flow of control proceeds to the step S130. In this step 9130, the control device 103 decides whether or not, by the user pressing the "end" button 2c upon the image display screen, a command has been issued for termination of the image display application. If the result of the decision in this step S130 is negative, then the flow of control returns to the step 910 and the processing described above is repeated. But, if the result of the decision in the step S130 is affirmative, then processing terminates.

Figure 17:
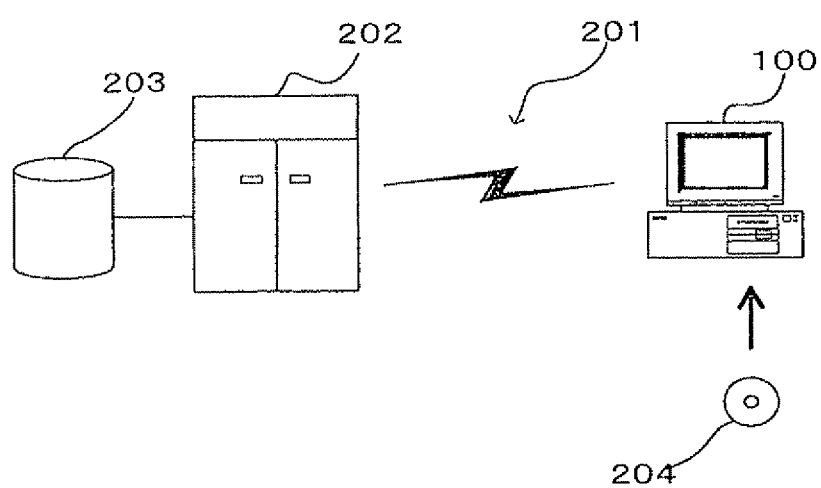
FIG. 17 is a figure showing a situation in which a program is supplied to a personal computer.

The program described above may be supplied upon a recording medium such as a CD-ROM or the like, or via a data signal such as the internet or the like. FIG. 17 is a figure showing this situation. The personal computer 100 receives supply of the program via a CD-ROM 204. Moreover, the personal computer 100 is endowed with the function of connection to a communication circuit 201. A computer 202 is a server computer that supplies the program described above, and stores the program upon a recording medium such as a hard disk 203 or the like. The communication circuit 201 may be the internet, a dedicated communication circuit, or the like. The computer 202 reads out the program by using the hard disk 203, and transmits the program via the communication circuit 201 to the personal computer 100. In other words, it embodies the program as a data signal upon a carrier wave, that it then transmits via the communication circuit 201. In this manner, the program may be supplied as a computer-readable computer program product in various different formats, such as a recording medium or a data signal (carrier wave) or the like.

According to this embodiment as explained above, the following beneficial operational effects may be obtained.

(1) When a list of thumbnail images is displayed upon the image display screen, and at least one thumbnail image from among this list is selected by the user and the user presses the "display map" button 2f, then the control device 103 acquires the country code of the country of photography on the basis of the latitude and longitude information for the ground point (position or place) of photography. And the control device 103 refers to the correspondence table shown in FIG. 12, specifies a map server corresponding to the country of photography, and requests that specified map server to transmit map data having a range including the ground point of photography. Moreover, when the control device receives map data from the map server, it displays a map display screen, and displays the thumbnail image upon the map in the neighborhood of the ground point of photography. By doing this, the control device 103 is able automatically to select a map server for which the probability is high that relatively detailed map data is stored thereon, and to acquire and display this map data.

(2) It is arranged for the control device 103 to refer to the correspondence table shown in FIG. 3 in which a correspondence is maintained between latitudes and longitudes and country codes, and to specify the country code of the country of photography. Due to this, it is possible to specify the country of photography on the basis of the latitude and longitude information recorded in the appropriate portion of the header of the image file.

(3) If a plurality of thumbnail images are selected by the user upon the image display screen and a map display command is issued, then it is arranged for the control device 103 to specify, as the map server from which map data is to be acquired, a map server in that country in which, from among the countries of photography of the images corresponding to the selected thumbnail images, the greatest number of these corresponding images were photographed. Due to this, it is possible to select the optimum map server, even if several different countries are included in the countries of photography of the images corresponding to the selected thumbnail images.

Variant Embodiments

It should be understood that the image display device of the embodiment described above may be varied in the following ways.

(1) In the embodiment described above, an example was explained in which the control device 103 converted the latitude and longitude information to a country code by referring to the correspondence table shown in FIG. 3, in which a correspondence was maintained between latitudes and longitudes, and country codes for identifying countries. However, if a service that returns a country code when latitude and longitude information is transmitted is available over the Internet, then it would also be acceptable to obtain the country code from the latitude and longitude information by utilizing this type of service. By doing this, it is possible to acquire the country code in a simple and easy manner by employing a service that already exists. This can be achieved by a system similar to the system shown in FIG. 17. It is assumed that the computer 202 provides the above service.

(2) In the embodiment described above, an example was explained in which the control device 103 displayed the thumbnail images in positions upon the map corresponding to the photography positions of the corresponding images. However, it would also be acceptable to arrange for the control device 103 to display figures upon the map in positions indicating the photography positions, i.e. indicating that these positions are the positions of photography. And it would be acceptable, when the user actuates the actuation unit 101 and selects one of these figures that are being displayed upon the map, to arrange to display the image that was photographed at this ground point of photography.

(3) In the embodiment described above, an example was explained in which, as data specifying the ground point of photography, the latitude and longitude information for the ground point of photography was recorded in the appropriate portion of the header of the image file. However, the case should also be considered of an image file upon the HDD 104 of the personal computer 100, in which no latitude and longitude information is recorded in its header. In this case, it would be acceptable to arrange for the control device 103 to make the "display map" button 2f ineffective, so that the user cannot press it, when a thumbnail image of such an image file for which no latitude and longitude information is recorded in the appropriate portion of its header has been selected upon the image display screen. Or, if a thumbnail image of such an image file for which no latitude and longitude information is recorded in the appropriate portion of its header has been selected upon the image display screen and the "display map" button 2f has been pressed, it would also be acceptable to arrange for the control device 103 to display a message to the effect that no latitude and longitude information is appended to the image file, and to query the user as to whether to perform map display regardless, or alternatively to cancel the map display. In this case, if the user issues a command for map display to be performed, then it will be acceptable to arrange for the control device 103 to acquire map data for a region that is set in advance from a map server that is set in advance, and to display a map screen based upon this map data. The above variation can be achieved by replacing step 100 of FIG. 16 with the above processing.

Figure 18:
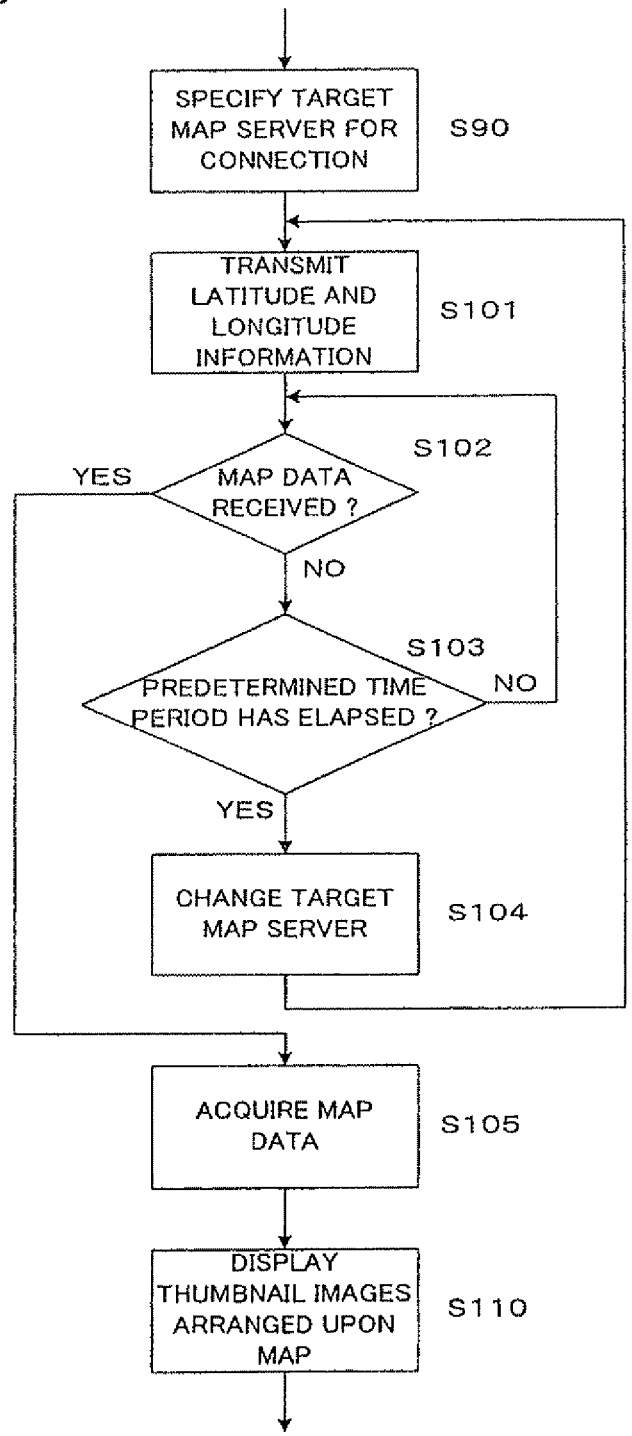
FIG. 18 is a figure showing an example of a variant embodiment.

(4) In the embodiment described above, an example was explained in which the control device 103 referred to the correspondence table shown in FIG. 12, and, in principle, acquired map data by connecting to a map server installed in the country of photography of the image that was the subject of display. However it would also be acceptable, if more than a fixed time period has elapsed without any response being received from this map server that is the target for connection, to arrange to decide that this map server is out of service, and to change over the target for connection to a map server that is installed in some other country. For example, if it has been decided that the map server that is the target for connection is out of service, then it may be arranged for the control device 103 to change over the target for connection to the map server that, in the correspondence table shown in FIG. 12, is designated in the next record after the current target for connection server. Or, it would also be acceptable to arrange for it to be possible to display upon the monitor 105 the URLs 12b of a plurality of targets for connection that are registered in the correspondence table shown in FIG. 12, in other words the URLs 12b of a plurality of map information servers that may be connected to, so that the user is able to select one of these URLs as a target for connection. By doing this, it is possible to acquire and display map data, even if the map server that is the primary target for connection is out of service. FIG. 18 shows a flow of an example of the above processing. Steps 101-104 replace step 100 of FIG. 16.

Figure 19:
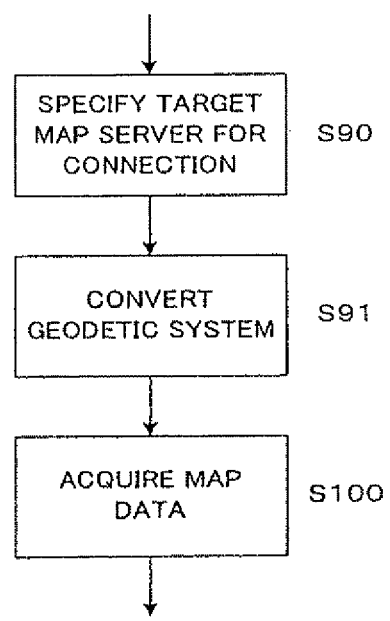
FIG. 19 is a figure showing an example of a variant embodiment.

(5) In the embodiment described above, an example was explained in which the control device 103 requested the is map server that was the target for connection to transmit map data by transmitting latitude and longitude information specifying the ground point of photography of the display subject image to this target for connection map server. However, the case should be considered in which the geodetic system of the GPS information recorded in the appropriate portion of the header of the image file acquired from the digital camera is not the same as the geodetic system of the map server that is the target for connection. In this case, if the control device 103 transmits the latitude and longitude information acquired from that appropriate portion of the image file to the map server just as it is without modification, then it is not possible for the map server to be apprised of the correct position of photography. Accordingly, in this case, the control device 103 should transmit the latitude and longitude information to the map server, only after having converted it so as to match the geodetic system of the map server. By doing this, it is possible to specify the correct photographic position in the request to map server for transmission of map data, even if the geodetic system of the GPS information recorded in the appropriate portion of the header of the image file and the geodetic system of the map server that is the target for connection are different from one another. FIG. 19 shows a flow of an example of the above processing. Step 91 is inserted between step 90 and step 100 of FIG. 16.

(6) In the embodiment described above, an example was explained in which map servers installed by a map information supply company in each country were employed. However, it would also be acceptable to arrange to utilize map servers that the supplier of the image display application according to the present invention has installed individually in each country.

(7) In the embodiment described above, an example was explained in which a personal computer 100 was utilized as an image display device. However, it is also possible to apply the present invention to some other type of device, for example a digital camera or the like, that is equipped with a storage device or a storage medium upon which an image file is recorded, a display device that displays an image, and a communication device for communicating with an external map server.

It should be understood that the present invention is not to be considered as being limited in any way by the structure of the embodiments described above, provided that its characteristic function is not lost. Moreover, it would also be possible to provided various combinations of features of the basic embodiment described above, and features of one or more of the variant embodiments.

What is claimed is:

1. An image display device comprising:
    an image display unit that displays a list of images each already including information related to a position of photography;
    a selection unit that selects at least one image from among the images displayed by the image display unit;
    a photography position information acquisition unit that acquires the information related to the position of photography of the image selected by the selection unit from the selected image;
    a communication unit that is capable of connecting to a plurality of external map servers each having map data to be used for displaying a map around the position of photography of the selected image;
    a specification unit that selects a map server, which has map data suitable for displaying a map on which information specifying the position of photography of the selected image is displayed, from among the plurality of external map servers, based on the information related to the position of photography acquired by the photography position information acquisition unit, and specifies the selected map server as a map server from which map data is to be acquired via the communication unit;
    a requesting unit that transmits to the map server specified by the specification unit the information related to the position of photography acquired by the photography position information acquisition unit, and that requests the map server to transmit map data for an area that includes the position of photography, via the communication unit;
    a reception unit that receives the map data transmitted from the map server specified by the specification unit via the communication unit; and
    a display control unit that displays a map based on the map data received by the reception unit, and displays information specifying the position of photography of the image selected by the selection unit upon the displayed map, wherein the specification unit specifies a country in which the image was photographed based on the information related to the position of photography of the image, and selects a map server that is installed in the specified country and has map data of the specified country, from among the plurality of external map servers as a map server from which map data is to be acquired.

2. An image display device according to claim 1, wherein:
    the information specifying the position of photography is latitude and longitude information for the position of photography; and
    the specification unit specifies the country in which the image was photographed by employing a conversion table for converting the latitude and longitude information for the position of photography into a country code for specifying a country.

3. An image display device according to claim 1, wherein:
    the information specifying the position of photography is latitude and longitude information for the position of photography; and
    the specification unit specifies the country in which the image was photographed by transmitting the latitude and longitude information for the position of photography over the Internet to a conversion service that converts the latitude and longitude information for the position of photography into a country code for specifying a country, and that returns the country code.

4. An image display device according to claim 1, wherein:
    when the selection unit has selected a plurality of images, the specification unit specifies, as a map server from which map data is to be acquired, a map server in a country, among countries of photography of the plurality of images, in which the greatest number of images were photographed.

5. An image display device according to claim 1, wherein:
    when a geodetic system of the map server is different from a geodetic system of the information related to the position of photography included in the image, the requesting unit requests the map server to transmit map data, after having converted the geodetic system of the information related to the position of photography included in the image, to the geodetic system of the map server.

6. An image display device according to claim 1, further comprising:
    a notification unit that, when the image selected by the selection unit does not include the information relating to the position of photography, notifies a user a fact that the image does not include the information relating to the position of photography.

7. An image display device according to claim 6, wherein:
    when the notification unit has notified the user the fact that the image does not include the information relating to the position of photography, the requesting unit requests a map server that is set in advance to transmit map data for an area that is set in advance.

8. An image display device according to claim 1, wherein:
    when no response has been received from the map server specified by the specification unit after a predetermined time has elapsed from when the server was requested to transmit map data, the requesting unit requests a map server installed in a country that is different from a country of the map server specified by the specification unit to transmit map data.

9. A non-transitory computer-readable medium having computer executable instructions for performing steps, the steps comprising:
    an image display step of displaying a list of images each already including information related to a position of photography;
    a selection step of selecting at least one image from among the images displayed by the image display step;
    a photography position information acquisition step of acquiring the information related to the position of photography of the image selected by the selection step from the selected image;

a communication step capable of connecting to a plurality of external map servers each having map data to be used for displaying a map around the position of photography of the selected image;

a specification step of selecting an map server, which has map data suitable for displaying a map on which information specifying the position of photography of the selected image is displayed, from among the plurality of external map servers, based on the information related to the position of photography acquired by the photography position information acquisition step, and specifying the selected map server as a map server from which map data is to be acquired via the communication step;

a requesting step of transmitting to the map server specified by the specification step the information related to the position of photography acquired by the photography position information acquisition step, and that requests the map server to transmit map data for an area that includes the position of photography via the communication step;

a reception step of receiving the map data transmitted from the map server specified by the specification step via the communication step; and a display control step of displaying a map based on the map data received by the reception step, and displays information specifying the position of photography of the image selected by the selection step upon the displayed map, wherein the specification step specifies a country in which the image was photographed based on the information related to the position of photography of the image, and selects a map server that is installed in the specified country and has map data of the specified country, from among the plurality of map servers as a map server from which map data is to be acquired.

* * * * *